United States Patent [19]

Ko

[11] 4,381,115

[45] Apr. 26, 1983

[54] DOOR WEATHER-STRIP

[75] Inventor: Yoshimasa Ko, Hiroshima, Japan

[73] Assignee: Nishikawa Rubber Co., Ltd., Hiroshima, Japan

[21] Appl. No.: 246,152

[22] Filed: Mar. 23, 1981

[30] Foreign Application Priority Data

Mar. 31, 1980 [JP] Japan .............................. 55/43733[U]
Nov. 27, 1980 [JP] Japan .......................... 55/171781[U]

[51] Int. Cl.³ .............................................. E06B 7/23
[52] U.S. Cl. .................................. 277/207 R; 49/489; 49/498
[58] Field of Search ................... 49/489, 498; 277/226, 277/207 R

[56] References Cited

U.S. PATENT DOCUMENTS

| 2,622,286 | 12/1952 | Beck | 20/69 |
| 2,952,053 | 9/1960 | Frehse | 20/69 |
| 2,969,252 | 1/1961 | Gruver | 49/498 |
| 3,656,260 | 4/1972 | Weaver et al. | 49/498 |
| 4,232,081 | 11/1980 | Pullan | 49/498 |

FOREIGN PATENT DOCUMENTS 54-5447 3/1979 Japan .

OTHER PUBLICATIONS

1971 Car Shop Manual, Ford Pinto, Aug., 1970.

Primary Examiner—Robert I. Smith
Attorney, Agent, or Firm—Armstrong, Nikaido, Marmelstein & Kubovcik

[57] ABSTRACT

A weather-strip for an automobile door adapted to be mounted on the edge of the door and closely contact with a body of the automobile when the door is closed, thereby preventing any foreign matter from entering into the automobile. The weather-strip comprises a base section which is to be mounted on the edge of the door and a hollow seal section integrally formed with the base section. The hollow seal section comprises a first wall having a protrusion formed at the upper end thereof, a second wall and a mountain-shaped top wall having a ridge formed therein. The hollow seal section is adapted to collapse when the door is closed, thus providing a positive sealing effect for the automobile door.

3 Claims, 4 Drawing Figures

DOOR WEATHER-STRIP

BACKGROUND OF THE INVENTION

This invention relates to an improvement in an weather-strip attached to peripheral edges of doors of automobiles. In the weather-strips of the kind specified which have heretofore been employed, when the door is closed, a seal portion of the weather-strip attached to the peripheral edge of the door is brought into sealing contact with a body panel. In that case, however, a generally triangular spacing is formed between the seal portion and the body panel because the seal portion is of a hollow configuration and the leading end thereof is bent at a relatively large radius of curvature. Therefore, if during car washing etc. water is injected on the car body at a high pressure, the injected water tends to enter the spacing and push open the seal portion of the weather-strip thereby leaking into the inside of the door.

SUMMARY OF THE INVENTION

It is therefore an object of the present invention to provide a weather-strip for an automobile door which can overcome the above noted problem.

Another object of the present invention is to provide a weather-strip for an automobile door which is able to provide a reliable sealing when the door is closed.

In accordance with an aspect of the present invention, there is provided a weather-strip for an automobile door composed of an elastic rubber-like material and of a uniform cross sectional shape throughout its length and adapted to be mounted on the edge of the door and closely contact with a body of the automobile when the door is closed, said body having a first section parallel to the plane of door opening and a second section generally perpendicular to the first section, said weather strip comprising: a base section adapted to be mounted on the edge of the door; and a hollow seal section integrally formed with said base section; said hollow seal section comprising: a first wall projecting from said base section and having a sealing surface formed thereon; a protrusion continually and integrally formed with said first wall and having a sealing surface formed thereon; a second wall projecting from said base section; and a mountain-shaped top wall integrally formed with said first and second walls, said top wall having a ridge formed therein, said hollow seal section having first, second and third bends between said first wall and said top wall, said second wall and said top wall, and at the ridge of the top wall, respectively; wherein said seal section is adapted to collapse when the door is closed in such a way that the sealing surfaces of said first wall and said protrusion are brought into a press contact with the first section of said body and the ridge of said top wall is brought into a press contact with the second section of said body.

The above and other objects, features and advantages of the present invention will be readily apparent from the following description taken in conjunction with the accompanying drawings.

DESCRIPTION OF THE PREFERRED EMBODIMENTS

Figure 1:
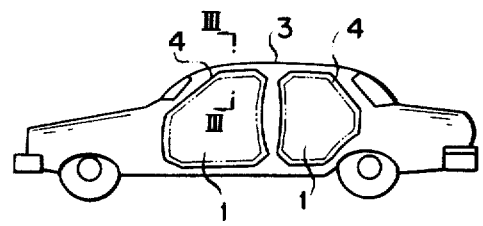
FIG. 1 is a side elevation of an automobile provided with a door weather-strip according to the present invention.
Figure 2:
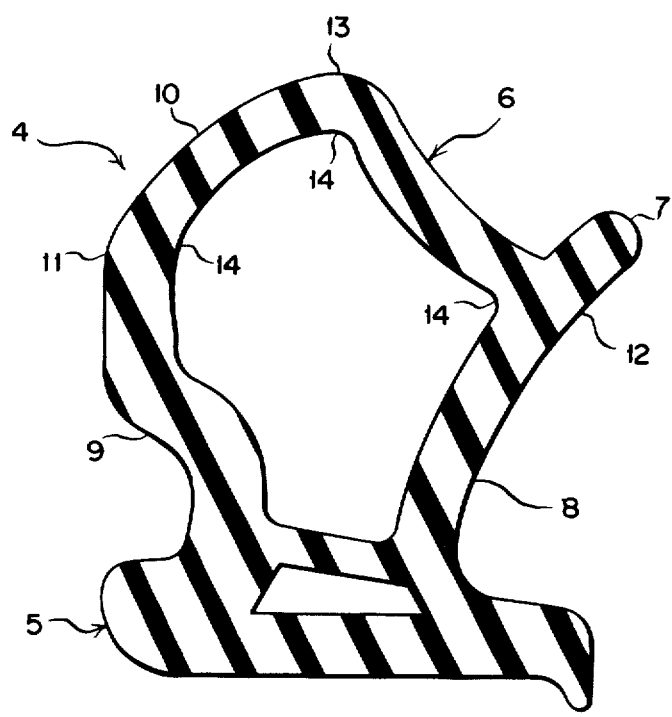
FIG. 2 is an enlarged cross-sectional view of a weather-strip according to the present invention.

The present invention will now be described in detail below by way of example only with reference to the accompanying drawings.

A door 1 of an automobile has a peripheral edge 2 which is formed by a sash etc. with a weather-strip 4 mounted thereon which is formed by extrusion molding of rubber and which comprises a base portion 5 and a hollow seal portion 6. The adjacent portion of the automobile is body panel 3.

The seal portion 6 has a sectional shape comprising a first wall portion 8 which curves towards the body panel 3 when mounted in place and which has a protrusion 7 formed in the upper end thereof, and a second wall portion 9, both wall portions upstanding from the base portion 5. A mountain-shaped or roof-shaped top wall 10 is connected between the upper ends of the wall portions 8 and 9. Connecting portions 11 and 12 and a ridge 13 of the mountain-shaped top wall 10 are each formed with a bend 14.

Thus, the base portion 5 of the weather-strip 4 is fitted to the peripheral edge or sash 2 of the door 1, and when the door 1 is closed the seal portion 6 can be brought into sealing contact with the body panel 3. When the seal portion 6 makes sealing contact with the body panel, the whole outer sealing surfaces of the protrusion 7 and the inner wall portion 8 are brought into sealing contact with a first section 3a of the panel 3, generally parallel to the plane of the door opening, whilst the ridge 13 of the mountain-shaped top wall 10 is brought into sealing contact with a second section 3b of the panel 3 generally perpendicular to the first section 3a.

Figure 3:
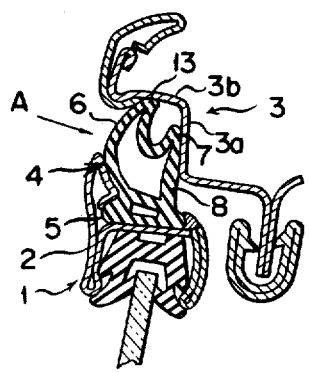
FIG. 3 is a cross-sectional view taken along the line III—III of FIG. 1 showing how the weather-strip is collapsed for sealing when the door is closed.

Therefore, even if the injected water strikes against the seal portion 6 as shown by an arrow A in FIG. 3, it is blocked by the mountain-shaped top wall 10, and if water under a high pressure passes through the space between the ridge 13 of the mountain-shaped top wall 10 and the second section 3b of the panel 3, the projection 7 and the first wall portion 8 which are brought into sealing contact with the first section 3a will prevent the injected water from entering into the inside of the door 1. The reason is that the protrusion 7 has a small radius of curvature at the leading end thereof and so there is almost no clearance or spacing formed between the protrusion 7 and the first section 3a so that the pressure of the water invaded into the extremely limited space cannot become high enough to push open the first wall portion 8.

Additionally, the generation of noise caused by whistling wind passing through the clearance between the door and the body panel can be prevented by the seal effect of the ridge 13 of the mountain-shaped top wall 10. Further, because the first wall portion 8 extending upwardly from the base portion 5 is curved towards the body panel 3 and a bend 14 is formed in the connecting portion 12 connecting the upper part of the first wall portion 8 with the mountain-shaped top wall 10, the first wall portion 8 extending upwardly and sectioned by the bend 14 will not be subjected to the influence of the movement of the mountain-shaped top wall 10 in the case where the weather-strip is bent in a circular arc shape and fitted to the corner portion of the door 1. Therefore, at that time, no substantial vertical and transverse displacement of the first wall portion 8 from the normal position thereof will take place.

Further, when the door is closed, the change in the deflection load exerted on the weather-strip relative to the amount of displacement of the door after the weather-strip 4 mounted on the door begins to contact with the body panel 3 is very small or limited so that the door can be completely closed with a small force applied thereto and can maintain its satisfactory water-tightness.

Figure 4:
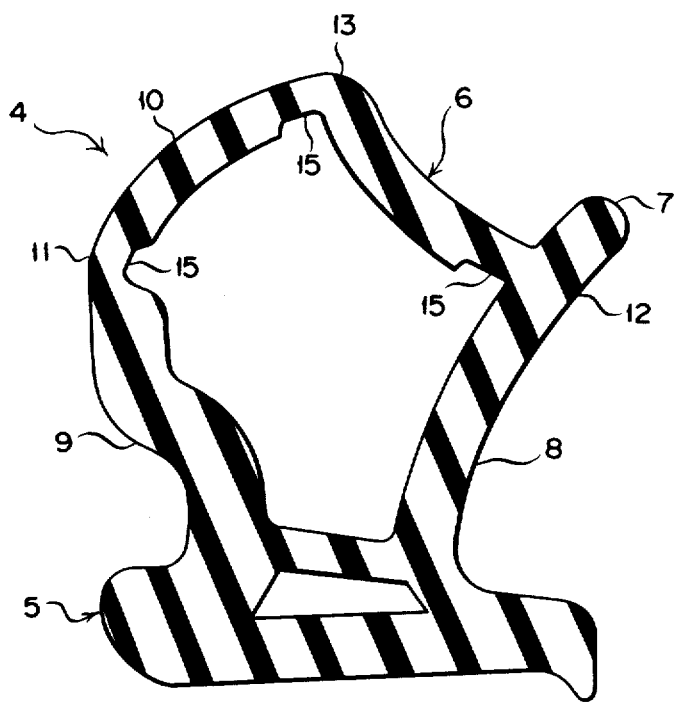
FIG. 4 is similar to FIG. 2 showing another embodiment of the present invention.

Referring to FIG. 4, there is shown another embodiment of the weather-strip according to the present invention having a groove 15 formed in each of bend portions. The formation of the grooves 15 allows the seal portion 6 to be deformed more readily than the first embodiment.

In view of the foregoing, the present invention is advantageous in that even when a water pressure is applied to the peripheral edge 2 of the door 1 during car washing etc., the seal portion 6 of the weather-strip 4 can prevent the invasion of injected water by a special effect given by its particular shape thereby preventing water from leaking into the inside of the car compartment and also improves sound-proof effect. Further the weather-strip 4 can be fitted to the circular arc shaped corner portion of the door under a satisfactory condition and also the door-closing performance can be improved remarkably.

It is to be understood that the foregoing description is merely illustrative of preferrerd embodiments of the present invention, and that the scope of the invention is not to be limited thereto, but is to be determined by the scope of the appended claims.

What I claim is:

1. A weather-strip for an automobile door composed of an elastic rubber-like material and of a uniform cross sectional shape throughout its length and adapted to be mounted on an edge of the door and closely contact with a body of the automobile when the door is closed, said body having a first section parallel to the plane of the door opening and a second section generally perpendicular to said first section, said weather-strip comprising:

a base section adapted to be mounted on the edge of the door; and
   a hollow seal section integrally formed with said base section;
   said hollow seal section comprising:
   a first wall projecting from said base section and having a sealing surface formed thereon;
   a protrusion continually and integrally formed with said first wall, said protrusion having a sealing surface formed thereon;
   a second wall projecting from said base section; and
   a mountain-shaped top wall integrally formed with said first and second walls, said top wall having a ridge formed therein, said hollow seal section having first, second and third bends between said first wall and said top wall, said second wall and said top wall, and at the ridge of said top wall, respectively; wherein said seal section is adapted to collapse when the door is closed in such a way that the sealing surfaces of said first wall and said protrusion are brought into a press contact with the first section of said body and the ridge of said top wall is brought into a press contact with the second section of said body.

2. A weather-strip for an automobile door as recited in claim 1 wherein there are formed first, second and third longitudinal grooves in and around said first, second and third bends, respectively.

3. A door seal assembly for an automobile, comprising:

a door;
   a body panel for receiving said door, said body panel having a first edge parallel to the plane of the door opening and a second edge which is generally perpendicular to the first edge; and
   a weather-strip comprising an elastic rubbery strip of uniform cross-section for mounting around an edge of said door, said weather-strip comprising:
   a base section mounted on the edge of said door;
   a hollow seal section outstanding from said base section;
   said hollow seal section comprising:
   a first wall outstanding from said base section and having a sealing surface formed thereon;
   a second wall outstanding from said base section;
   a protrusion continuously and integrally formed with said first wall, said protrusion having a sealing surface formed thereon; and
   a convex top wall for interconnecting said first and second walls, said top wall having a ridge formed therein, said hollow seal section having first, second and third bends between said first and top walls, said second and top walls, and at the ridge of said top wall, respectively; wherein said seal section is adapted to collapse when the door is closed in such a way that the sealing surfaces of said first wall and said protrusion are brought into a sealing contact with the first edge of said body panel and the ridge of said top wall is brought into a sealing contact with the second edge of said body panel.

* * * * *